Nov. 2, 1937.  G. FAILLA  2,097,760

TESTING METHOD AND APPARATUS

Filed Nov. 29, 1930   2 Sheets-Sheet 1

Gioacchino Failla
INVENTOR

BY Darby & Darby
ATTORNEYS.

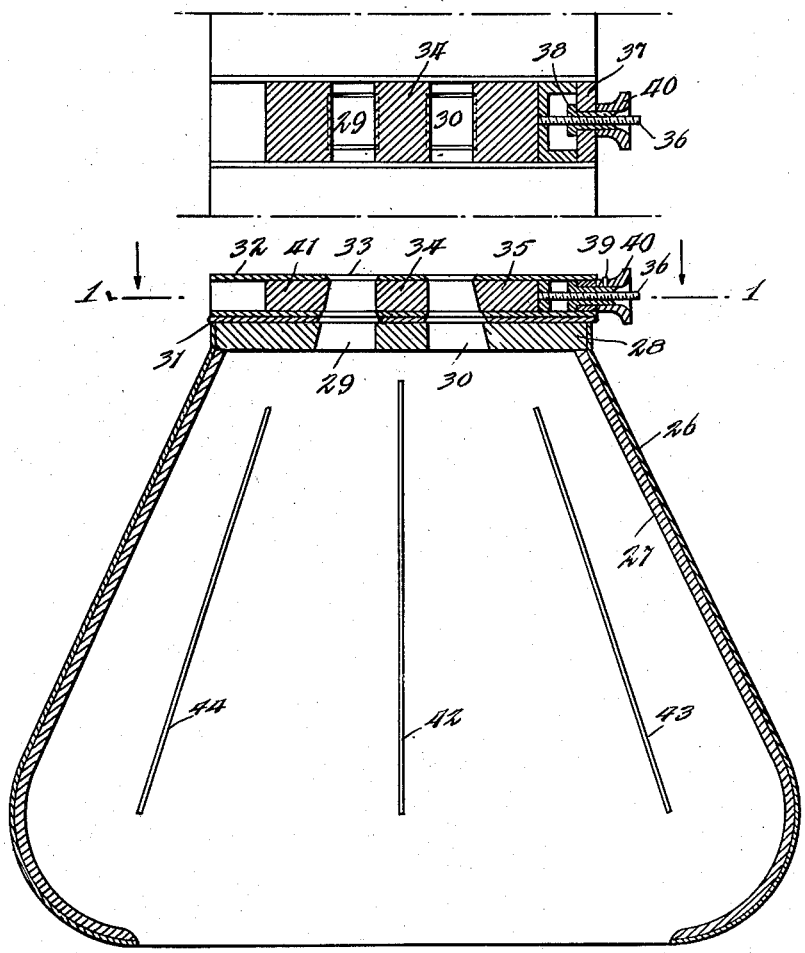

Patented Nov. 2, 1937

2,097,760

UNITED STATES PATENT OFFICE 2,097,760

TESTING METHOD AND APPARATUS

Gioacchino Failla, New York, N. Y.

Application November 29, 1930, Serial No. 498,959

11 Claims. (Cl. 250—34)

This invention relates to testing methods, and with particularity to methods and means for testing the uniformity or lack of uniformity in solid materials.

An object of the invention is to provide an improved method of testing for and locating flaws in different classes of materials.

Another object of the invention is to provide an improved method and apparatus for employing radiations such as X-rays or similar rays for locating flaws in solid objects. While the invention is of pronounced importance as a means for detecting air pockets or other flaws in a metal body such as a casting or the like, it will be understood that in its broad application the invention is capable of use in a variety of arts where the internal structure of materials is required to be known.

A feature of the invention relates to the employment of a pair of ionization chambers in locating flaws in solid objects generally.

Another feature of the invention relates to the method of employing a pair of ionization chambers in testing a solid object for internal flaws, together with a novel method of comparing the amount of ionization in the respective ionization chambers.

In accordance with the present invention it is proposed to employ a pair of ionization chambers which are normally balanced relatively to each other when subjected to a uniform radiation. The method of detecting balance is preferably, although not necessarily, that disclosed in copending application Serial No. 385,912. As the result of this combined use of ionization chambers and the novel method of detecting balance set forth in said application, it is possible to detect internal flaws or defects in very dense or very thick objects, since the method used in practicing the present invention permits of the detection of extremely minute differences of ionization currents in the ionization testing chambers.

It will be understood, however, that the invention is not limited to any particular method of detecting balance, and is therefore broadly capable of use with other known systems of determining likeness of electrical conditions.

Referring to the drawings;

Fig. 2 is a cross-sectional view of one preferred type of open ionization chamber and adjustable baffle plate therefor;

Fig. 3 is a view of another type of ionization chamber employing a gas or vapor under pressure; and Fig. 4 is a schematic showing of one manner of practicing the invention in testing or analyzing qualitatively the composition of materials.

Figure 1:
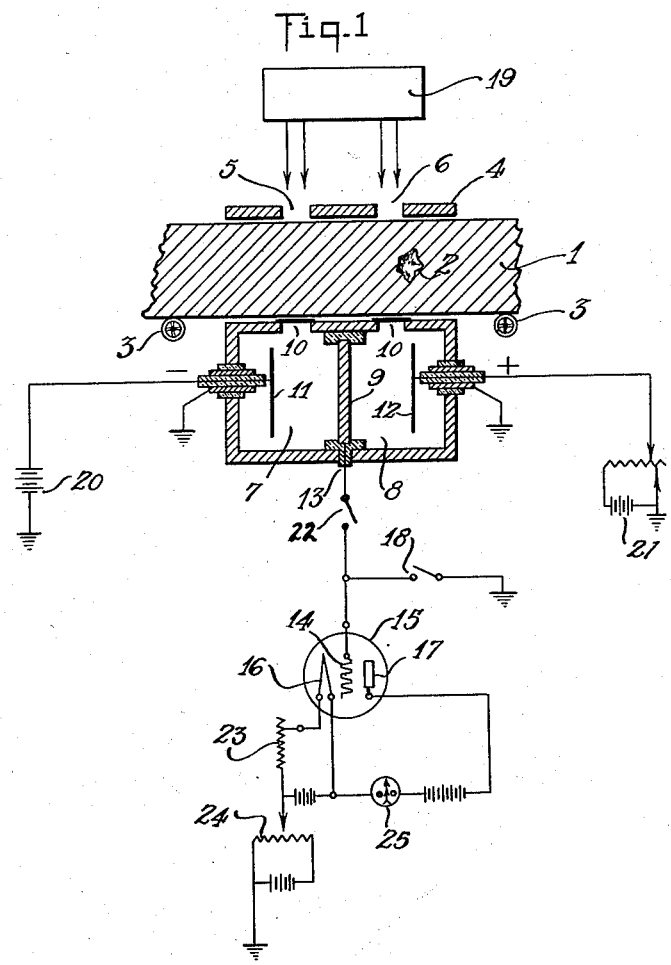
Fig. 1 is a schematic representation of one manner of practicing the invention.

Referring to Fig. 1 of the drawings, the numeral 1 represents schematically a portion of an object which is to be tested for uniformity or lack of uniformity. For example, this object may take the form of a heavy casting, and for the purpose of explanation, it will be assumed that there is an air pocket at the position indicated by the numeral 2. In the case of heavy objects such as castings, the object may be supported on guides or rollers 3, so as to enable it to be moved gradually across the testing beam. This testing beam is illustrated diagrammatically in the drawings by the arrows which may represent a beam of X-rays or other similar penetrating rays such as alpha, beta or gamma radiations. In the path of the rays is interposed a mask or shield 4 provided with two similarly shaped openings 5 and 6 through which the testing radiations are adapted to pass and thence impinge upon the body 1 to be tested. Mounted in any convenient manner beneath the body 1 are two ionization chambers 7 and 8 respectively. In the drawings these chambers are shown with a common wall 9, but it will be understood that separate chambers may be employed which are electrically connected in the manner disclosed in application Serial No. 385,912. The chambers 7 and 8 are preferably, although not necessarily, of similar size and shape and each contains the same volume of gas under the same pressure. Each of the chambers is provided on its upper wall with an opening 10 which is adapted to be placed in alignment with a corresponding opening 5 in the mask 4. Thus the beam of radiations is normally divided equally between the chambers 7 and 8. Preferably the mask 4 and the ionization chambers are situated relatively to each other and to the ionizing beam so that equal intensities of radiation enter the chambers.

Any suitable filter if desired may be provided for the openings 10 in the ionization chamber to permit the required quality and intensity of rays to pass into the respective chambers. Insulatingly mounted in the usual manner within the chambers 7 and 8 are the electrodes 11 and 12 respectively. The electrode 12 is connected to a source of positive potential as shown in the drawings, while the electrode 11 is connected to a source of negative potential as shown. The common wall 9 being of metal and insulated from the body of the chamber serves as a common electrode for the two chambers, and is connected by wire 13 to the grid 14 of an audion or electron discharge device 15 having an electron emitting cathode 16 and an anode 17. The grid 14 is adapted to be momentarily grounded by means of a switch 18 for purposes that will appear hereinbelow.

As a source of ionizing radiations any well known form of X-ray tube may be employed, or a radio-active source may be employed. As an alternative two separate radio active sources may be employed one for each of the chambers 7 and 8. Thus each source may be in the form of a tube containing a quantity of radio-active material, the tubes being situated as close as possible to the apertured diaphragms 10. In the case of radio-active sources an apertured mask must be employed to limit the cross section of the ionizing beams entering the ionization chambers. If an X-ray tube is employed it may of course be situated much further from the ionization chambers than the radio-active sources thus producing a single sharp conical beam, portions of which may be selected as by mask 4.

Assume for the purpose of explanation that the body 1 is removed and that the radiation from source 19 is adjusted to produce the desired quality of radiations, for example as described in application Serial No. 499,287, filed December 1, 1930. Also the chambers 7 and 8 may be adjusted relatively to the mask 4 so that equal intensities of radiations enter through the respective apertures 10. If the chambers 7 and 8 are of equal volume, or at least if the electrodes 11 and 12 have equal effective areas in the direction of the radiations as they pass through the respective chambers, all other conditions being equal, there will be produced an equal volume of ionization in the two chambers. Under this condition the device 25 will not deflect when key 18 is momentarily closed. It will be understood that the control electrode 14 of the vacuum device 15 has been previously brought to ground potential in the manner described in detail in application Serial No. 385,912, this initial adjustment having been made while the chambers 7 and 8 are unexposed to the ionizing radiations. This initial adjustment of device 15 is generally as follows. The potential of cathode 16 with respect to ground is adjusted by potentiometer 24 to such a point that momentary closure of switch 18 does not affect the anode current of device 15, as indicated by device 25. Under this condition the grid 14 may be said to be at ground potential, and thereupon the switch 18 is left open. If a change in anode current is noted when switch 18 is momentarily operated it means there is a greater amount of ionization in one chamber than in the other, and either aperture 5 or 6 must be varied in size depending upon which chamber has the greater volume of ionization. Instead of varying the mask aperture to control the volume of ionization, the distance of the ionizing source (or sources in the case of radio-active tubes) from the chambers may be varied.

When the condition of equal ionized volumes has been achieved the apparatus is in condition for testing and the body 1 to be tested is passed across the radiations in any suitable manner. As the body 1 moves, successive cross sections thereof are presented to the testing radiations. If no air pockets or other flaws are existent within the body of the material then obviously the radiations reaching the chambers 7 and 8 are substantially equal even though their intensity may be cut down by the body 1. However, as soon as a flaw passes the testing radiations, for example as shown in the drawings, (the flaw 2 being in alignment with the openings 6 and 10) there is less impedance to the radiations entering chamber 8. Consequently there will be a greater amount of ionization in chamber 8 than there is in chamber 7, thus upsetting the balance of the system and causing a deflection in the indicating device 25.

The indicating device may control an audible signal if desired, to indicate audibly when a defective or non-uniform portion of the body 1 reaches the testing beam. Similarly the body 1 may be moved automatically across the testing beam by suitable motive means, and the circuit to this motive means may be controlled by the device 25 to indicate the encountering of a defect in the body. Or an automatic recorder may be attached to the vacuum tube system as described in application Serial No. 385,912.

While in the foregoing description it has been assumed that the rays entering the chambers 7 and 8 are of equal intensity, this is not absolutely necessary. Assume for the purpose of explanation that the rays passing into chamber 7 are of slightly greater intensity than those entering chamber 8. Under this condition it is clear that the volume of ionization in chamber 7 is greater than that in chamber 8. An initial adjustment must therefore be made to bring the ionized volumes to equality or to any other predetermined ratio. For this purpose one or both sources 20 and 21 may be variable. This source 21 may be adjusted until the ionization in chamber 8 equals that in chamber 7, as indicated by device 25, the grid 14 having been previously brought to ground potential as described in application Serial No. 385,912. The apparatus is then in readiness to test the object 1, as above described.

Referring to Fig. 2, a description will now be given to a modified form of ionization chamber that is capable of being used with the circuits and equipment of Fig. 1.

In Fig. 2 the chamber proper is provided with an outer brass wall 26 and a lead lining 27. The bottom of the chamber is completely open to atmosphere while the top is provided with a closure member or cover 28 of lead or other heavy material. Cover 28 has two square or rectangular windows 29, 30, through which the X-rays or other radiations enter the ionization chamber. A brass plate 31 overlies the lead cover 28 and is provided with windows registering with the windows 29 and 30. Attached in any convenient manner to the brass plate 31 is a hollow rectangular metal frame 32 having windows 33 on its upper and lower faces adapted to register with the windows in the member 28 and the brass plate 31. Fastened within the member 32 at the central portion thereof is a block of metal 34, preferably of type metal or other similar material. Another block 35 of type metal is also positioned within the member 32 and has attached thereto a threaded member 36. The member 36 extends outwardly through a metal member 37 attached to the right hand end of the frame 32. Journaled in the member 37 is an internally threaded sleeve 38 and attached to the outer end of said sleeve by a pin 39 is an adjusting screw 40. Metal block 35 is free to slide within the frame 32 and its position relatively to the fixed block 34 may be accurately controlled by means of the thumb screw 40, thus in effect providing a highly accurate adjustable aperture in registry with the fixed aperture or window 30. If desired a similar adjusting arrangement may be provided for the metal block 41 at the opposite end of the frame 32. However, the block 41 need not necessarily be adjustable but may be initially placed in the proper spaced relation with respect to the block 34 and permanently fastened in its adjusted position.

Suitably mounted within the ionization chamber is a central electrode 42 and lateral electrodes 43 and 44 corresponding respectively to the electrodes 9, 11 and 12 of Fig. 1. There is thus provided an open ionization chamber wherein the diaphragm is accurately adjustable to control the size of the ionizing beams entering the ionization chamber. It will be understood of course that in using the chamber of Fig. 2 to determine the uniformity or lack of uniformity of materials, a separate adjustable diaphragm similar to the diaphragm disclosed is positioned above the object being tested corresponding to the diaphragm 4 of Fig. 1.

As will be noted from Fig. 2, the apertures in the adjustable diaphragm and in the fixed diaphragm 28 are tapered on one side to conform to the average taper of the conical beams derived from the ionizing source such as an X-ray tube. Similarly the lateral electrodes 43 and 44 are mounted at an inclination so that the beam as it passes through the chamber does not impinge directly upon the electrodes and is thus entirely effective in ionizing the gas between the electrodes. Under certain circumstances it may even be desirable to produce unequal volumes of ionization in which case the electrodes 43 and 44 may be of unequal area or length in the direction of the beam.

Referring to Fig. 3 a description will now be given of one preferred structure of ionization chamber employing a heavy gas or vapor under pressure.

In Fig. 3 the ionization chamber comprises a rectangular metal body 45 of iron or other suitable material. The side walls of the chamber 45 are provided with threaded extensions 46 to receive insulator blocks 47. Preferably this insulation is in the form of a quartz block and passing through the block 47 is a thin bar of material 48 preferably having the same coefficient of expansion as the insulator block 47. For this purpose Invar has been found to be very suitable for use in conjunction with the quartz insulator. As shown in the drawings the insulators are provided with a double taper, and also the bore of the extensions 46 is tapered so that when the nut 49 is tightened it clamps the insulator assembly rigidly in position in the wall of the ionization chamber. Each of the rods has fastened to its inner end, as by welding, soldering, or the like, a plate-like electrode 50. A common or central electrode 51 is also provided and is mounted in an insulating manner in the lower wall 52 of the chamber, in a manner similar to the mounting of the electrodes in the side walls. The chamber is connected by means of an inlet pipe 53 and valve 54 to a source of suitable gas or vapor under pressure and the chamber is also provided with a suitable pressure gauge 55 to indicate the pressure of gas within the ionization chamber. Instead of providing the upper wall with slots for the entrance of the ionizing radiations the upper wall is preferably provided with rectangular recesses 55 and 56, thus providing in effect a combined window and thin metal filter therein. An additional adjustable diaphragm is mounted on top of the chamber as indicated by the numeral 57 and this diaphragm is preferably of the design shown in Fig. 2, whereby the size of the beams entering the ionization chamber may be accurately adjusted. It is believed that the manner of using the chamber illustrated in Fig. 3 will be clear from the description already given in connection with Figs. 1 and 2.

It has been found that when the chamber is provided with a filling of heavy vapor under pressure such as mercury vapor, or methyl iodide vapor it is necessary to employ insulators of the type described since any ordinary type of insulation will break down under the temperature and pressure conditions of the enclosed vapor.

While in Fig. 1 an arrangement has been shown for determining the uniformity or lack of uniformity of materials under test the duplicate ionization chambers and electrical circuits therein disclosed are also capable of use in other connections. For example, it is highly desirable in certain of the arts, to be able expeditiously and accurately to compare samples of materials to detect possible adulteration. It has been found that the arrangement disclosed in Fig. 1 may be utilized in determining the qualitative composition of materials generally. It is well known in the science of X-ray that each element exhibits a maximum transparency for X-rays having a quality identical with that of its own characteristic radiations; and further, the absorption becomes abnormally large for X-rays which have a penetrating power just greater than that of the said characteristic radiations. There is shown in Fig. 4 an arrangement whereby this fact may be utilized in determining the qualitative composition of materials.

In Fig. 4 the numeral 58 represents schematically a duplicate ionization chamber of the type disclosed in either Fig. 1, 2 or 3, being provided with a pair of windows or apertures 59 and one or more adjustable lead diaphragms 60 having windows 61 registering with the windows 59 in the ionization chamber. The numeral 62 represents a source of X-rays which is preferably adjustable in any known manner to vary the quality or hardness of the rays. The chamber 58 is provided with a pair of lateral electrodes 63 and 64 and a common electrode 65. The electrode 63 is connected to a source of positive potential and the electrode 64 is connected to a source of negative potential while the common electrode 65 is connected to a balance detecting arrangement such as shown in Fig. 1. The procedure of utilizing the apparatus shown to determine the qualitative composition of a material is along the following lines—A piece of standard material 66 is placed in registry with the windows 59 and 61, and a piece of the material to be compared with the standard is positioned over the other two windows 59 and 61. Both the standard material and the material to be compared are subjected to the same beam of radiations from the source 62 which has been previously adjusted to give the proper degree of hardness to the radiation, or two equalized radio-active sources may be employed if desired. Preferably, the material to be tested has the same volume, or at least the same thickness as the thickness of the standard 66, and consequently under these conditions since the material being tested is of the same composition as the standard, then the X-ray beams passing through the windows 61 will be subjected to the same absorption effects and consequently the previously balanced ionization currents will remain balanced. If, however, the unknown material 67 is different from the standard 66 the ionization currents will be unbalanced and will be detected in the device 68. An alternative procedure in testing the qualitative composition of the unknown material 67 is as follows:

With the standard material 66 and the unknown material 67 positioned over the windows 61, as above described, the effective size of the windows 61 is adjusted until the device 68 indicates a balance as described in connection with Fig. 1. After this balance is obtained the voltage of the X-ray machine 62 is changed. Since each material has a characteristic radiation for which it exhibits abnormal absorption it will be seen that when the X-ray machine is adjusted to produce a quality of radiation having a penetrating power just greater than that of the characteristic radiation of some compound of the material 67, that there will be a material reduction in the ionization current between the electrodes 64 and 65, and this will result in an unbalanced indication in the device 68. There is thus provided an extremely expeditious and accurate manner of comparing the chemical constituents of an unknown material with a standard sample.

The range of voltages to be used on the X-ray generator depends on the chemical elements involved. For elements of low atomic number low voltages are used. For elements having higher atomic number correspondingly higher voltages are required. For example, assuming that the standard sample 66 is a piece of pure aluminum, and it is desired to determine whether or not the piece of aluminum 67 contains tungsten, then the voltage on the X-ray machine must be varied from 60 to 100 kilovolts since at this voltage X-rays are produced having penetrating power greater than the characteristic radiations of tungsten. Consequently at this point the material 67 will exhibit relatively the greatest amount of absorption.

In the case of other materials, reference may be had to any standard book of X-rays to determine the voltage required to exhibit the characteristic radiations of the elements to be tested for. In order to increase the sensitivity of the device and thus to enable very small differences in chemical composition to be detected it is preferable to use monochromatic X-rays. Approximately monochromatic X-rays for practical purposes may be obtained by proper adjustment of the voltage on the X-ray machine and by the use of appropriate X-ray filters.

If desired the voltage adjusting device for the X-ray source 62 may be calibrated so as to indicate directly the voltage and the materials having the characteristic radiations corresponding to those voltages, so that all that is necessary to qualitatively determine the chemical composition of the unknown material 67 is to notice when the device 58 indicates an unbalance, and to read directly on the voltage adjusting device the material corresponding to this particular voltage.

Other changes and modifications may be made without departing from the spirit and scope of the invention. For example, the ionization chambers may be made of unequal sizes and the difference in volume compensated for by using gases of different density or by using gases having different ionization characteristics.

While certain specific uses have been mentioned and described the invention is capable of other obvious uses. For example, it may be used to determine uniformity or lack of uniformity in thickness, or contour of objects. Similarly since the amount of ionizing radiation reaching the chambers is dependent upon the density of the objects interposed in the path of the beam it will be obvious that the instrument may be used to determine uniformity or lack of uniformity in density as well as comparing the unknown density of an object with that of an object whose density is known.

Furthermore, while in the foregoing description the operation has been based upon an initial balance of the ionized volumes, it will be understood that equality of ratio is merely one preferred choice and that the ionized volumes may initially be in any predetermined ratio, and reliance placed upon change of ratio as indicated by the balance detector to determine uniformity or lack of uniformity.

What is claimed is:

1. The method of testing the composition of a material which comprises producing a beam of X-rays, passing said beam through the material to be tested and through a piece of standard material, controlling ionization currents by controlling the X-rays passed through said materials, balancing the voltage drops due to said ionization currents, varying the quality of the X-rays at the source to determine whether voltage drops become unbalanced, and noting the quality of said X-rays for which unbalance occurs.

2. The method of comparing an unknown material with a standard material which comprises producing a beam of X-rays having a quality substantially identical with that of the characteristic radiation of the standard material, passing said beam through said standard material, and through said unknown material to control ionization currents, balancing the voltage drops due to said ionization currents and detecting whether said voltage drops are unbalanced when the unknown material is moved across said beam.

3. A system for testing a material comprising a pair of ionization chambers, a source of ionizing radiations for said chambers, said material being positioned between the source and said chambers to allow the rays from said source to pass simultaneously through spaced portions of the material into said chambers, means for indicating when the voltage drops across said chambers are unbalanced the last mentioned means including an electron-discharge device connected to both of said chambers, said device having an electron-emitting cathode, an anode and a control-grid situated in the electron stream between cathode and anode, a circuit connecting the anode and cathode and including a source of potential, means to adjust the potential of a predetermined point in the anode-cathode circuit of said device with respect to ground to bring the potential of the grid to ground potential while said grid is disconnected from said anode-cathode circuit, and an indicator device controlled by the anode-cathode current of said device.

4. Means for qualitatively testing an unknown material comprising means to produce a pair of X-ray beams from a common source, an ionization chamber for each of said beams, a piece of standard material interposed in the path of one of said beams prior to its entering the associated ionization chamber the unknown material being positioned in the path of the other beam, means to bring the total ionization in one chamber to substantial equality with the total ionization in the other chamber, and means to vary the quality of the beams at their source to determine a characteristic of said unknown material.

5. An instrument for testing a substance comprising a source of X-rays, a pair of ionization chambers adapted to have their contents ionized by said rays after passing through the object to be tested; an electron-discharge device having an electron-emitting cathode, an anode, a control grid situated in the electron stream, and a circuit including a source of potential connecting the cathode and anode; means to adjust the potential of a predetermined point in the anode-cathode circuit with respect to ground to bring the potential of the grid to ground potential while it is disconnected from the anode-cathode circuit, means to connect said grid to both said chambers; and an indicator controlled by the anode-cathode current of said device for determining when said grid is brought to ground potential by said adjusting means.

6. In combination, a source of X-rays; a pair of ionization chambers adapted to have their contents ionized by rays from said source; an audion having a cathode, an anode, and a control grid situated in the electron stream between the cathode and anode; a circuit including a source of potential between the anode and cathode; means to adjust the potential of a predetermined point in the anode-cathode circuit of the audion with respect to ground to bring the potential of the grid to ground potential while it is disconnected from the anode-cathode circuit; means to connect said grid simultaneously to both chambers and an indicator controlled by the anode-cathode current of said audion.

7. Means for testing an object for uniformity or lack of uniformity, comprising means for producing X-rays, a pair of ionization chambers arranged to have their contents ionized by said rays, means to bring the total ionization in one chamber to substantial equality with the total ionization in the other chamber without materially varying the quality of the rays entering the chambers, said object being positioned in the path of the X-rays prior to entering said chambers, means to expose spaced portions of said object simultaneously to said rays to produce separate ionization currents in said chambers, and means for detecting when the voltage drops across said ionization chambers are balanced.

8. Means for testing materials comprising a source of ionizing radiations; a pair of ionization chambers; apertures for the chambers through which predetermined portions of said radiations simultaneously pass through the material to be tested; and means to detect when the total ionization in the said chambers are equal, the last mentioned means including an audion having an anode-cathode system including a source of potential, and means connected between said system and ground for adjusting the potential of a point in the anode-cathode system of the audion with respect to ground to bring the grid of the audion while it is disconnected from said anode-cathode system, to static ground potential; and an indicator device controlled by the anode-cathode current of said audion.

9. In the art of testing a substance by X-rays, the method which includes the steps of generating a beam of X-rays, passing said beam through the substance to be analyzed and thence through an ionizable medium to produce a voltage drop through said medium, balancing said voltage drop against a standard voltage drop, controlling an indicating device in accordance with the resultant of said voltage drops, varying the quality of the X-rays at the source in accordance with the absorption characteristics of known materials, and detecting from the extent of said variation a characteristic of the substance being analyzed.

10. The method of testing an object which comprises, exposing two ionization chambers to ionizing radiations, adjusting the total ionization in one chamber to a predetermined ratio to the ionization in the other chamber, inserting the object to be tested with a portion thereof in the path of the ionizing radiations, then readjusting the total ionization in the chambers to said predetermined ratio and without materially varying the quality of the radiations entering the chambers, moving the object across said radiations, and detecting whether said ratio varies in response to said movement.

11. The method of testing the density of a material which comprises, exposing two ionization chambers to a beam of X-rays, adjusting the total ionization in one chamber to a predetermined ratio to the total ionization in the other chamber without materially varying the quality of the rays entering the chambers, inserting a quantity of the material whose density is to be tested in the beam entering one chamber and a quantity of the same material whose density is known in the beam entering the other chamber, readjusting the total ionization in the chambers to said ratio without materially affecting the quality of the rays entering the chambers, and detecting whether said ratio changes in response to movement of the material whose density is being tested.

GIOACCHINO FAILLA.